UNITED STATES PATENT OFFICE.

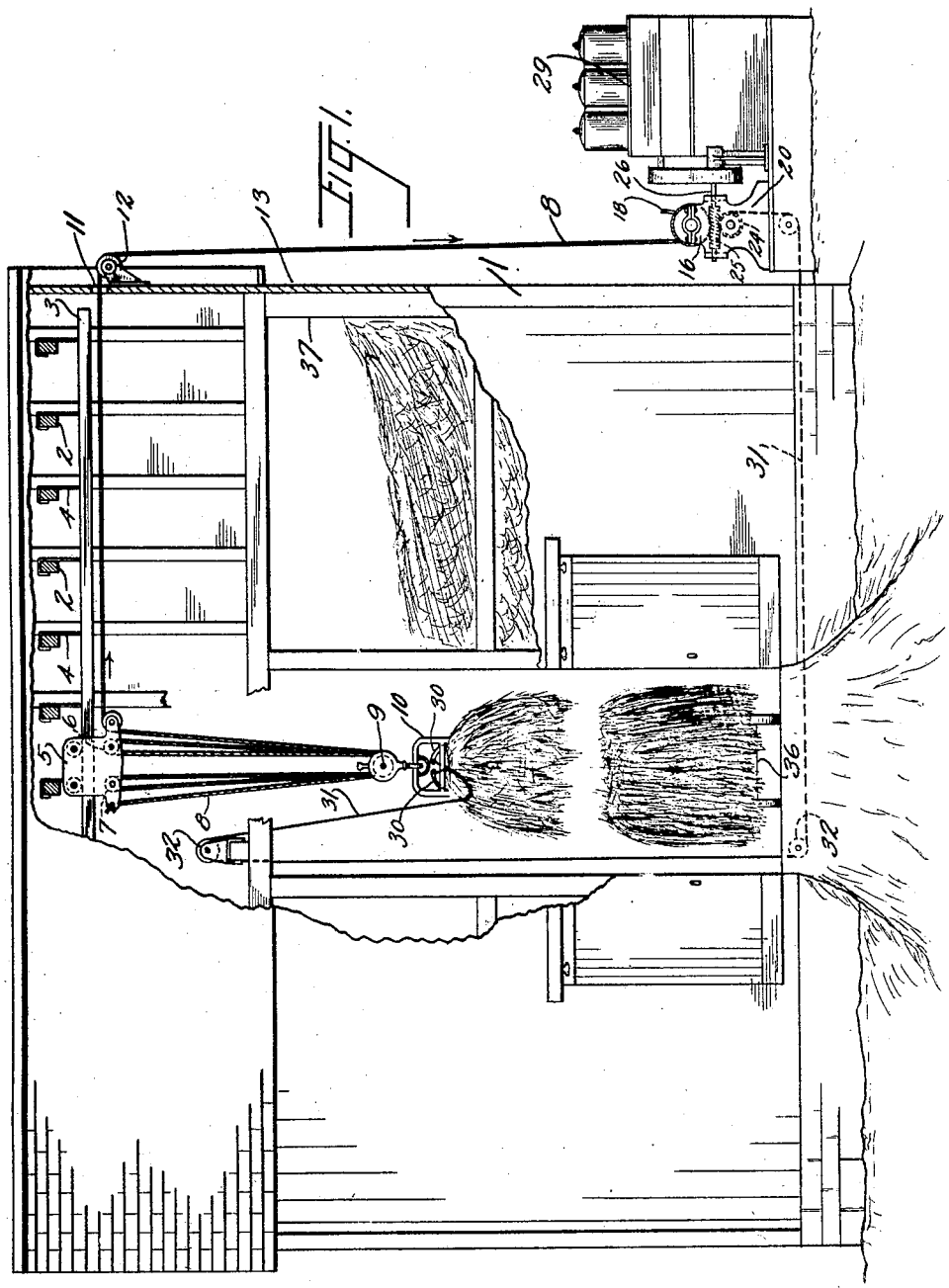

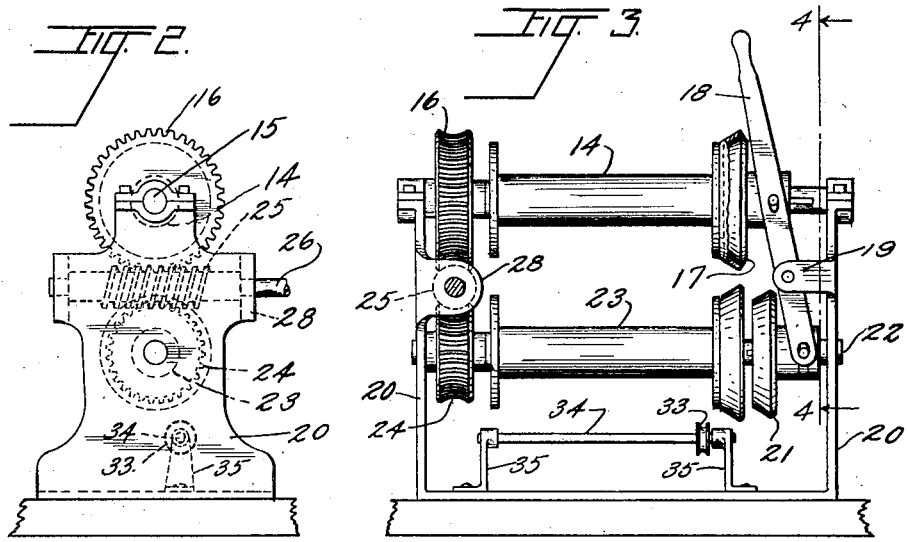
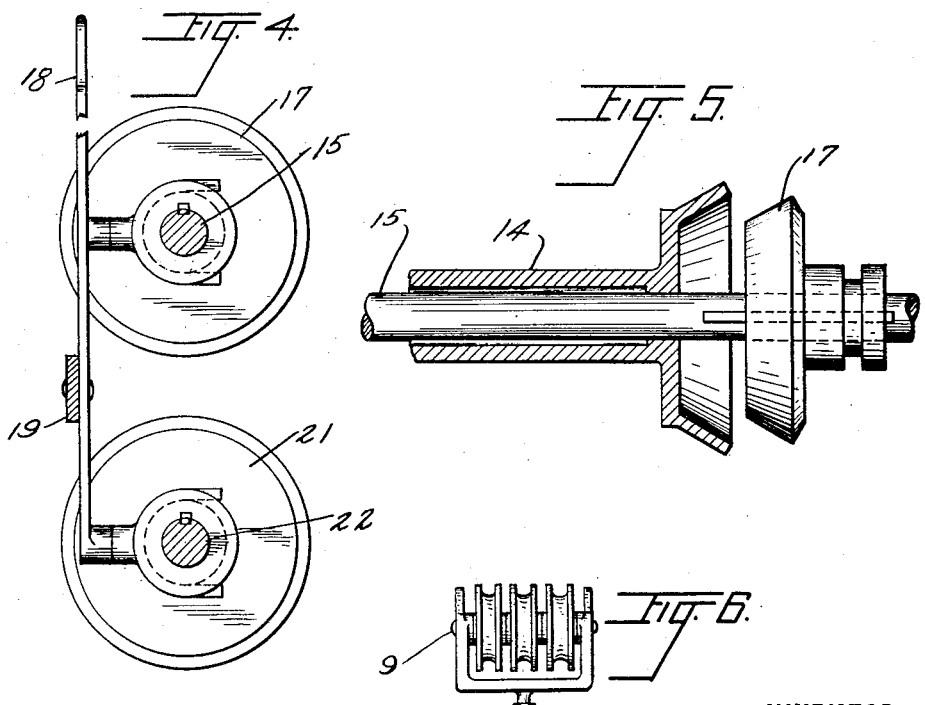

EDWARD CHARLIE FREDRICKSON, OF CHETEK, WISCONSIN.

HAY-HANDLING APPLIANCE.

1,354,247.

Specification of Letters Patent. Patented Sept. 28, 1920.

Application filed February 1, 1918. Serial No. 214,894.

*To all whom it may concern:*

Be it known that I, EDWARD C. FREDRICKSON, a citizen of the United States, residing at Chetek, in the county of Barron, in the State of Wisconsin, have invented certain new and useful Improvements in Hay-Handling Appliances, of which the following is a specification.

This invention relates to improvements in hay handling appliances and more particularly to mechanism for loading hay, straw and the like from a wagon into a barn loft or other storage place. One object is to provide mechanism of this class that may be operated by a gasolene or other motor which may be positioned inside or outside the barn as desired. A further object is to provide mechanism of this class that can be operated in an economical and efficient manner.

With the foregoing and other objects in view the invention consists in the combination and arrangement of parts to be hereinafter fully described, pointed out in the appended claim and illustrated in the accompanying drawings which form a part of this specification and in which—

Figure 1 is a sectional view of a barn showing the application of my mechanism.

Fig. 2 is an end elevation of the rope drums and driving gear therefor.

Fig. 3 is a side view of Fig. 2.

Fig. 4 is a section taken on line 4—4 of Fig. 3.

Fig. 5 is an enlarged fragmentary sectional view of one rope drum and the driving clutch therefor. Fig. 6 is a detail view of a pulley employed.

Like reference characters denote corresponding parts throughout the several views.

The reference numeral 1 denotes a barn to the rafters 2 of which a track or runway 3 is secured by the several supports 4. A carriage 5 is adapted to run over the said runway 3 and said carriage is provided with the pulleys 6, 7, about the latter of which a cable 8 is secured which passes through a pulley 9 that carries the hay fork 10 and then passes over the pulley 6 and out through an opening 11 in the barn and over a pulley 12 carried by one wall 13 of the barn and is secured to the drum 14 upon which it may be wound or unwound. The drum 14 is loose upon a drum shaft 15 to which shaft a gear 16 is made fast, said drum shaft also being provided with the sliding clutch 17, keyed thereto, and adapted to be thrown into or out of engagement with the said drum 14 to drive or release the same. A lever 18 connected to the said clutch 17 serves to actuate the same and is fulcrumed to a lug 19 formed upon the frame 20 in which frame the said shaft 15 is fulcrumed. The said lever 18 is also connected to a second clutch 21 keyed to a second shaft 22 journaled in the said frame 20, said shaft 22 loosely carrying a rope drum 23, which may be driven by the clutch 21, said shaft 22 having made fast thereto a gear 24 which together with gear 16 is in mesh with a worm 25 of worm shaft 26 which is journaled in lugs 28 of the frame 20, said worm shaft being driven by the motor 29. It is obvious from the construction shown and described that the shafts 15, 22 are driven constantly in opposite directions and that by means of the hand lever 18 either rope drum may be driven by its shaft.

Referring again to the hay fork 10, the same is provided with the pivotally carried dogs 30 to which the trip or return rope 31 is secured, said rope passing over guide pulleys 32 suitably supported within the barn, and beneath the floor of the barn, and over a sheave 33 arranged upon a shaft 34 carried by standards 35 secured to the said frame 20; said rope passing from the sheave 33 to and about the said second drum 23. When the rope or cable 8 has been sufficiently wound upon its drum 14 by rotation of that drum with its shaft 15, drum 23 being then disengaged from its shaft 22, the fork 10 will be raised to the carriage 5 and the fork and carriage moved over the runway 3 toward the wall 13 of the barn. The fork 10 having been loaded with hay from the wagon 36 in the usual manner previous to the operation just described the fork may be tripped and its load of hay dropped into the loft 37 by reversing the lever 18 and so rotating drum 23 with its shaft 22 and disconnecting drum 14 and its shaft 15. As the dogs 30 are tripped the fork and carriage will be started along the runway upon the return trip. When the carriage 5 has reached a position over the wagon the motor can be stopped or the worm shaft disconnected from the motor. The fork 10 will then descend through gravitation, or a hooked pole or other suitable means may be used to bring it down, when it may be again loaded with hay and the same moved to the loft in the manner previously described.

What is claimed is:—

In a hay handling apparatus, an overhead runway, a carriage mounted for travel thereon, a supporting frame, upper and lower shafts journaled in the frame and provided with gears, winding drums mounted for rotation on the shafts, a bracket secured to the supporting frame near the lower drum, a shaft journaled in the bracket, a sheave secured to said shaft, a cable operatively connected with the carriage and upper winding drum respectively, a fork supported by the cable and including a trip device, a second cable operatively connected with the trip device and extending over the sheave on said shaft and connected with the lower winding drum, a worm interposed between and meshing with both gears for operating the same, and means for selectively operating the drums.

In testimony that I claim the foregoing as my own I have hereto affixed my signature in the presence of two subscribing witnesses.

EDWARD CHARLIE FREDRICKSON.

Witnesses:
A. T. GALBY,
M. D. STRONG.